(12) United States Patent
Sohmshetty et al.

(10) Patent No.: US 8,346,381 B2
(45) Date of Patent: Jan. 1, 2013

(54) COMPUTERIZED SYSTEM AND METHOD FOR RECOMMENDING PART MATERIALS

(75) Inventors: Raja Shekar Sohmshetty, Canton, MI (US); Nicholas P. Warrick, Livonia, MI (US); Shawn Michael Morgans, Chelsea, MI (US); Zhiyong Cedric Xia, Canton, MI (US); Michael James Freeman, Allen Park, MI (US)

(73) Assignee: Ford Motor Company, Dearborn, MI (US)

( * ) Notice: Subject to any disclaimer, the term of this patent is extended or adjusted under 35 U.S.C. 154(b) by 205 days.

(21) Appl. No.: 12/582,215

(22) Filed: Oct. 20, 2009

(65) Prior Publication Data

US 2011/0093105 A1   Apr. 21, 2011

(51) Int. Cl.
*G06F 19/00* (2011.01)
(52) U.S. Cl. ............... 700/106; 700/98; 700/107
(58) Field of Classification Search ............ 700/97, 700/98, 106, 107
See application file for complete search history.

(56) References Cited

U.S. PATENT DOCUMENTS

| | | | | |
|---|---|---|---|---|
| 5,552,995 | A * | 9/1996 | Sebastian ................. | 700/97 |
| 7,590,937 | B2 * | 9/2009 | Jacobus et al. .............. | 715/700 |
| 7,716,019 | B2 | 5/2010 | Liu | |
| 2002/0013631 | A1 * | 1/2002 | Parunak et al. ............. | 700/28 |
| 2005/0209732 | A1 * | 9/2005 | Audimoolam et al. ....... | 700/216 |
| 2007/0016432 | A1 * | 1/2007 | Piggott et al. ............... | 705/1 |
| 2009/0204237 | A1 * | 8/2009 | Sustaeta et al. .............. | 700/36 |
| 2011/0172794 | A1 * | 7/2011 | Sohmshetty et al. ......... | 700/97 |

OTHER PUBLICATIONS

"Automotive Steel Design Manual," Designing for Stamping Operations, May 1996, p. 1-42.
G.Q. Huang, et al., Design for Manufacture and Assembly on the Internet, Computers in Industry: An International Journal, vol. 38, No. 1, 17-30 (1999).
D. Anderson, Masters of Science Graduate Student, Concurrent Engineering in Manufacturing, Submitted in Partial Completion of the Requirements of IDEN 5303, Advanced Manufacturing Systems Design, Fall 1999.

* cited by examiner

*Primary Examiner* — Michael D Masinick
(74) *Attorney, Agent, or Firm* — Damian Porcari Brooks Kushman P.C.

(57) ABSTRACT

A computer-implemented method for recommending one or more materials used in designing and manufacturing parts may include receiving data from at least three data sources. The data sources may include a sourcing, manufacturing, and design data source. The data source data may be standardized to obtain a collection of data including a dataset of materials for consideration in recommending one or more materials for use in one or more parts. The method may also include receiving optimization metrics and constraints for the dataset of materials. Optimization values for each material based on the dataset of materials and the one or more optimization metrics may be determined. An optimization algorithm on each material may be performed based at least on the optimization values and the constraints to obtain one or more recommended materials from the dataset of materials for use in a design of one or more parts.

18 Claims, 4 Drawing Sheets

COMPUTERIZED SYSTEM AND METHOD FOR RECOMMENDING PART MATERIALS

BACKGROUND

1. Technical Field

One or more embodiments include a computerized system and method for recommending materials for one or more parts in a part design, sourcing, and manufacturing process.

2. Background Art

Recently, the price for commodities such as steel has been rising sharply. Some vehicle manufacturers, for example, have been particularly affected by these price changes. These increases can cause a drain on a vehicle company's finances sometimes in the hundred's of millions of dollars. Moreover, while the price of commodities is increasing, the cost of material processing technologies is decreasing. For example, the cost of laser welding technologies has significantly reduced over the past few years. These factors contribute to challenges in designing vehicle parts, for example, meeting part attribute requirements (such as performance and cost) while using the best manufacturing alternative possible.

Various examples exist in the prior art that attempt to provide a solution for this complexity. A thesis paper entitled "Concurrent Engineering in Manufacturing" authored by Don Anderson provides an overview and analysis of the concept of Concurrent Engineering. The paper discusses the scope of Concurrent Engineering in manufacturing through the use of examples and by describing its benefits in Computer-Integrated Manufacturing.

Another paper entitled "Design for Manufacture and Assembly on the Internet" authored by Huang, G. Q., et al. discusses the use of the Internet with respect to design for manufacture and assembly (DFMA) techniques. The paper discusses an experiment that is conducted to illustrate how a design-for-assembly technique, typically performed on a standalone workstation, can be converted into a web-based version.

While these papers describe processes having benefits in their own right, the prior art still lacks a complete process that takes information from all relevant aspects of part production including, but not limited to, design, purchasing, and manufacturing to determine a manufacturing solution that meets part requirements, but is also financially sound. That is, what would further benefit a vehicle development and production process is a web-based tool that recommends materials using not only manufacturing information, but also sourcing information at the beginning stages of part production.

SUMMARY

One aspect includes a computer-implemented method for recommending one or more materials used in designing and manufacturing one or more parts. The method may include receiving on one or more computers data from at least three data sources. The three data source may include a sourcing data source, a manufacturing data source, and a design data source.

The method may further include standardizing on the computer the data from the at least three data sources to obtain a collection of data. The collection of data may include a dataset of materials for consideration in recommending one or more materials for use in one or more parts. The method may further include receiving on the computer one or more optimization metrics and one or more constraints for the dataset of materials.

The method may further include determining on the computer one or more optimization values for each material based on the dataset of materials and the one or more optimization metrics. An optimization algorithm on each material may be performed based at least on the one or more optimization values and the one or more constraints to obtain one or more recommended materials from the dataset of materials for use in a design of one or more parts. In one embodiment, at least one of the one or more optimization values may be a time-dependent value such as a cost of materials.

The one or more optimization metrics may include one or more cost metrics and the one or more optimization values may include one or more cost values. Additionally, the one or more optimization metrics may further include one or more performance metrics and the one or more optimization values may further include one or more performance values.

In one embodiment, the optimization algorithm may be performed during a design phase of the one or more parts.

The method may further include receiving as user input the one or more optimization metrics selected by the user from one or more optimization metric data libraries. The one or more optimization metric data libraries may include at least one cost metric library and at least one performance metric library.

The method may further include receiving on the computer supplier-dependent data from the sourcing data source and performing the optimization algorithm based on the one or more optimization values, the one or more constraints, and the supplier-dependent data.

In one embodiment, the one or more optimization metrics may include a first optimization metric and a second optimization metric. As such, the method may further include equalizing the first optimization metric to a specific value and ordering the recommended materials according to the second optimization metric.

A second aspect may include a computer-implemented system for recommending one or more materials used in designing and manufacturing one or more parts. The system may include at least one computer. The at least one computer may be configured to receive data from at least three data sources. The three data sources may include a sourcing data source, a manufacturing data source, and a design data source. The at least one computer may be further configured to standardize the data from the at least three data sources to obtain a collection of data. The collection of data may include a dataset of materials for consideration in recommending one or more materials for use in one or more parts.

The at least one computer may be further configured receive one or more optimization metrics and one or more constraints for the dataset of materials. The at least one computer may be further configured to determine one or more optimization values for each material based on the dataset of materials and the one or more optimization metrics. Additionally, the at least one computer may be further configured to perform an optimization algorithm on each material based on the one or more optimization values and the one or more constraints to obtain one or more recommended materials from the dataset of materials for use in a design of one or more parts.

In one embodiment, the system may further include the at least three data sources including a sourcing data source, a manufacturing data source, and a design data source.

The system may further include an optimization metric parameter value database. As such, the at least one computer may be further configured to determine the one or more optimization values by receiving the one or more optimization values from the optimization metric parameter value database. Furthermore, the at least one computer configured to perform the optimization algorithm may be further configured to perform a calculation based on the one or more optimization values received from the optimization metric parameter value database.

The at least one computer may be further configured to generate one or more computer-aided design (CAD) models at least partially based on the one or more recommended materials. The at least one computer may be further configured to display the one or more CAD models. Furthermore, the at least one computer may be further configured to perform the optimization algorithm with respect to the one or more CAD models. The one or more CAD models may be one or more parametric finite element models.

The at least one computer may be further configured to receive the one or more optimization metrics and the one or more constraints as user inputs.

Another aspect may include a computer-program product embodied in a computer readable medium for recommending one or more materials used in designing and manufacturing one or more parts. The computer-program product may include instructions for receiving data from at least three data sources. The at least three data source may include a sourcing data source, a manufacturing data source, and a design data source. The computer-program product may further include instructions for standardizing the data from the at least three data sources to obtain a collection of data including a dataset of materials for consideration in recommending one or more materials for use in one or more parts. The computer program product may further include instructions for receiving one or more optimization metrics and one or more constraints for the data of materials. The computer program product may further include instructions for determining one or more optimization values for each material based on the dataset of materials and the one or more optimization metrics.

Additionally, the computer program product may further include instructions for performing an optimization algorithm on each material based on the one or more optimization values and the one or more constraints to obtain one or more recommended materials from the dataset of materials for use in a design of one or more parts.

The computer-program product may further include instructions for: generating one or more computer-aided design (CAD) models at least partially based on the one or more material suggestions and displaying the one or more CAD models.

These and other aspects of the present invention will be better understood in view of the attached drawings and following detailed description of the invention.

BRIEF DESCRIPTION OF THE DRAWINGS

The features of the present invention which are believed to be novel are set forth with particularity in the appended claims. The present invention, both as to its organization and manner of operation, together with further object and advantages thereof, may best be understood with reference to the following description, taken in connection with the accompanying drawings, in which:

DETAILED DESCRIPTION

Detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

In a vehicle part design and manufacturing process, there may be numerous materials to choose from in making one or more parts. Certain materials may be preferred by particular divisions of an OEM over others. For example, sourcing may prefer certain materials because of cost while manufacturing may prefer certain materials because of the materials' formability and weldability. At times, these preferences may not be compatible between divisions.

In deciding the material to utilize, any number of factors may be relevant to the decision. For strategic reasons, however, the different factors may be weighted differently for different divisions. Accordingly, a decision made by one division for a particular commodity, for example, maybe negated by another division. This may result in a "trial and error" process for selecting one or more materials until any conflicts in material selection between all divisions are minimized or resolved. Consequently, design and production of one or more parts may be inefficient, costly, onerous, and time-consuming.

Figure 1:
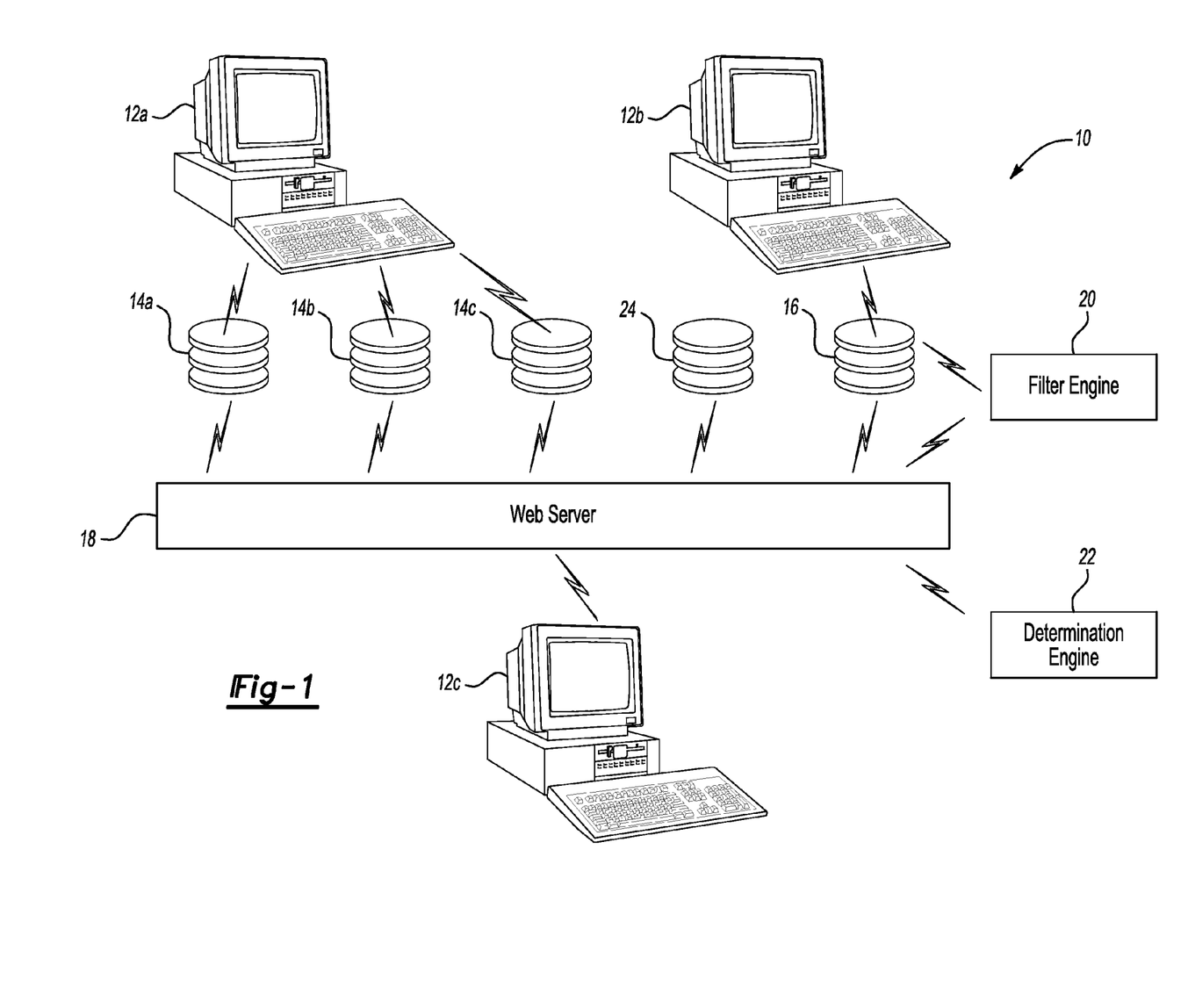
FIG. 1 shows a system for recommending materials for one or more parts according to one or more embodiments.

FIG. 1 is an exemplary illustration of a computer system 10 upon which one or more embodiments described below may be performed. The system 10 may include a number of computer terminals 12a, 12b, and 12c which may be used by a number of individuals associated with an original equipment manufacturer (OEM). In one embodiment, the OEM may be a vehicle manufacturer. Non-limiting examples of users may include administrators, participants and general users.

Administrators may include individuals responsible for administration of the system 10 including, but not limited to, maintenance of databases 14a, 14b and management of user access to system 10. For example, administrators may provide authorization to, and determine the authorization level of, one or more general users of system 10.

Participants may include individuals having access to computer database 16 for updating and managing data in database 16. Participants may be member of a purchasing division of an OEM, a manufacturing division of an OEM, or the like. Database 16 may include data for standardization. Non-limiting examples of data may include manufacturing data, design data (e.g., material specification data) and sourcing data. In one embodiment the data may be stored in one database or, in another embodiment, the data may be stored in separate databases. Thus, database 16 maybe one or more databases. For example, the manufacturing data may be stored in a manufacturing database, the sourcing data may be stored in a sourcing database, and the design data may be stored in a design database.

General users are end users of the system 10. For example, the general users may receive the recommendations for one or more materials for one or more parts. The recommendation process will be described below.

Terminal 12a may be in communication with one or more databases 14a, 14b. Databases 14a may be, in one embodiment, optimization metric libraries for storing optimization metric models for one or more metrics. The metric libraries may include optimization metrics including, but not limited to, cost metrics and performance metrics which the general user may select as inputs with regard the material recommendation process. The cost metrics and performance metrics may pertain to the material type.

Database 14b may include one or more optimization parameter values. Non-limiting examples of optimization parameters may include yield strength, modulus, density, tensile strength, thickness, radius, mean radius, length, force, and cost. The optimization parameters may be parameters of the performance or cost metrics inputted by the general user. Databases 14a, 14b may be managed and maintained by administrators from terminal 12a. In one embodiment, administrators may manage database 14a, 14b through web server 18. Furthermore, general users from terminal 12c may communicate with databases 14a, 14b through web server 18.

In one embodiment, terminal 12a may also be in communication with database 14c which may include a library of technologies used in manufacturing one or more parts. The technologies may be stored in database 14c as computer-aided design (CAD) data. In one embodiment, the CAD data is used to generate CAD models of the technologies. The CAD models may be parametric finite element models. In a further embodiment, the optimization algorithm (described below) may be used with respect to the CAD models.

The technology library may be accessed by general users from terminal 12c through web server 18 for selecting one or more technologies for use in a design and manufacturing process of one or more parts. Non-limiting examples of technologies may include laser welding, hydroforming, stamping, injection molding, and casting.

Terminal 12b may be in communication with database(s) 16. In one embodiment, database(s) 16 may additionally or alternatively be a materials database including a number of materials from which one or more parts may be manufactured. In one embodiment, the materials data may be included in one or more of the design database, the manufacturing database, or the sourcing database. The materials database may comprise a universe of materials available for use in manufacturing. Participants may have access to the one or more databases 16 from terminal 12b for updating the one or more databases 16 with new data or deleting data, for example.

In one embodiment, administrator and general users may also communicate with the one or more databases 16. For example, administrator may be responsible for maintenance of database 16. General user may receive data from the one or more databases 16 using one or more filter engines 20. The filtered data may be communicated to general user through web server 18. The filter engine 20 may standardize the data from the one or more databases 16 in order to, for example, generate a set of materials for consideration in recommending materials for one or more parts.

Filter engine 20 may be one or more filter engines. Furthermore, the one or more filter engines may filter data according to one or more filter strategies defined by, for example, the OEM.

A materials strategy filter engine may filter data from the universe of materials. The materials strategy filter engine may have one or more filters. For example, the materials strategy filter engine may include one or more lower priority filters and one or more higher priority filters. Lower priority filters may filter the set of materials according to materials that are considered by the OEM to be preferred materials for use in manufacturing a particular part. In one embodiment, filter engine 20 may be configured to filter the universe of materials according to the lower priority filter(s) as a default. The lower priority filter(s) may present a more restrictive number of materials than the higher priority filter(s).

Higher priority filter(s) may filter the universe of materials according to materials that are required to be selected as based on OEM strategy. The materials presented may include one or more preferred materials as well. Furthermore, the higher priority filter(s) may present a broader number of materials than the lower priority filter(s).

Filter 20 may additionally or alternatively be a manufacturing strategy filter engine. The manufacturing strategy filter engine may filter the universe of materials based on data in a manufacturing data source (represented by database 16). A non-limiting example of a manufacturing strategy filter may include stamping plant complexity reduction requirements. Thus, the universe of materials may be filtered to provide those materials that reduce stamping plant complexity. The requirements of the stamping plant may be determined from the manufacturing data source.

An additional filter engine may be a vehicle program strategy filter engine. The vehicle program strategy filter engine may filter the universe of materials according to the vehicle program (e.g., a Ford F-150, a Ford Focus, etc). The filter may be based on where the particular vehicle is built. For example, if one vehicle program is based in Asia, the program filter engine may filter the materials according to what materials may be available in Asia. The vehicle program data may be stored in a database 16, for example, in a manufacturing database.

Filter 20 may additionally or alternatively be a purchasing strategy filter engine. The purchasing strategy filter engine may filter the universe of materials according to sourcing data stored in the sourcing database (represented by database 16). The sourcing database may include a universe of suppliers providing the one or more materials. The database 16 may include the cost of the materials from these suppliers as well. A non-limiting example of a filter may include filtering the materials data according to material grades having an "n" number of suppliers from whom the materials can be purchased. Another non-limiting example may be filtering the data according to which suppliers are preferred by the OEM for supplying the one or more materials. The sourcing database may include a flag or identifier for identifying preferred suppliers. As an example of the former filter, the filter engine 20 may filter the universe of materials based on a filtering constraint that there be two suppliers from which the materials can be purchased in a particular geographic region.

It should be understood that the filter engines are not mutually exclusive. One or more filter engines may be applied to the universe of materials. For example, a particular filter may be to filter the universe of materials for materials having at least one preferred supplier in three geographic locations where a vehicle is manufactured. Based on this filter, the result may show a set of materials having at least one supplier in Asia, Europe, and North America. Thus, each of the materials filter engine, the purchasing filter engine, and the vehicle program filter engine is utilized in filtering or standardizing the universe of materials.

Instructions may be stored on web server 18 to filter the universe of materials using one or more filter engines 20. Alternatively or additionally, the instructions may be transmitted from terminal 12c.

The filters or standardization criteria in the one or more filter engine(s) 20 may be revised. The filter strategies may be revised by, for example, the administrator. For example, the filters may be revised because of the costs of particular materials, the location of particular suppliers, and/or strategic changes within the OEMs (e.g., the closing of particular plants). It should be understood that these examples are non-limiting. These revisions may be made by, for example, manually changing the flag or identifier in the materials database (e.g., and without limitation, from a preferred material to a required material and vice-versa).

One or more filters may or may not be a fuzzy filter for interpreting "fuzzy" or imprecise constraints. A precise constraint, such as (and without limitation) "every material must have at least two suppliers," may result in a definite inclusion or exclusion of a material in a standardized set of materials for consideration. On the other hand, a fuzzy constraint, such as (and without limitation) "purchasing prefers materials that have many suppliers," may generate "fuzzier" results. In one embodiment, the application of a fuzzy filter may result in ranking materials on a scale of most suitable to least suitable according to the constraint.

In one embodiment, filter engine(s) 20 may be stored as one or more modules in web server 18. Web server 18 may also include, or be in communication with, a determination engine 22. It should be understood that filter engine 20 and the determination engine 22 may be arranged in one module or as separate modules consistent with the practice in the art. For purposes of illustration and clarity, however, filter engine 20 and determination engine 22 are depicted as separate modules. Determination engine 22 may include one or more algorithms for recommending one or more materials for one or more parts. The recommendations may be based on the one or more inputs including, but not limited to, metrics inputted by the general user with respect to the materials. Determination engine 22 may further include one or more algorithms for optimizing the recommended materials. The optimization algorithm may optimize the recommended materials based on optimization criteria inputted by the general user. The determination engine 22 may additionally include a ranking algorithm for ranking the recommended materials. The ranking algorithm may rank the materials based on one or more optimization factors that are inputted by a general user. Further details of the optimization process and the ranking process will be described below.

Terminal 12c may include a graphical user interface (GUI) for displaying information to the end user. Terminal 12c may communicate with server 18 over a wireless network (e.g., the Internet, LAN, WAN, GAN, or Intranet) as in, for example, a client-server relationship. In one embodiment, information displayed to the general user may be through one or more web pages accessed via a web browser (e.g., INTERNET EXPLORER manufactured and distributed by The Microsoft Corporation). Software for performing material recommendations may be downloaded to terminal 12c from web server 18. Alternatively or additionally, the software may be stored in persistent or non-volatile memory in web server 18.

Figure 2:
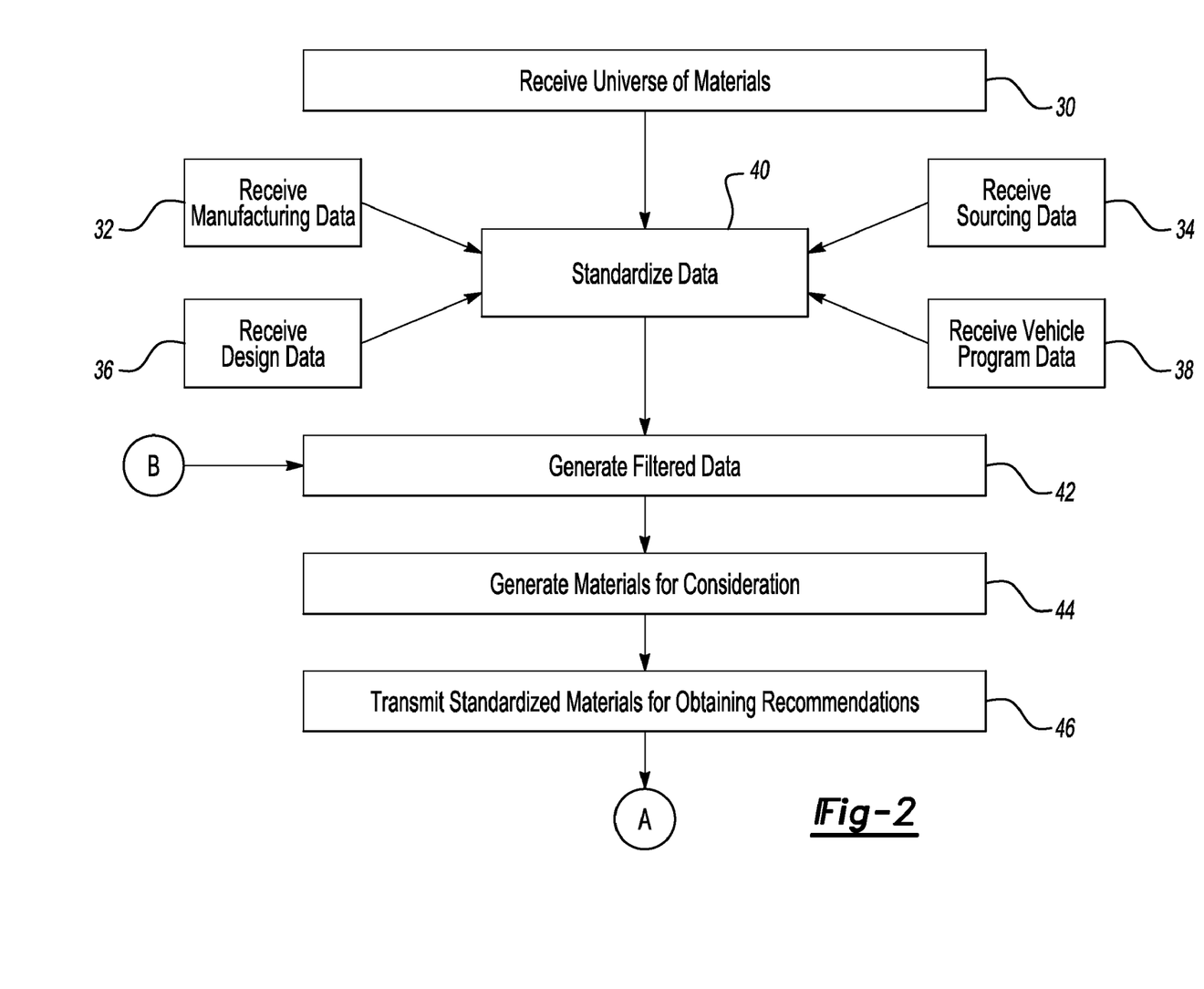
FIG. 2 shows a materials recommendation process for one or more parts according to one or more embodiments.

The process of recommending materials for use in designing and manufacturing one or more parts may include multiple aspects. FIG. 2 provides an exemplary illustration of one aspect according to one of the various embodiments. One aspect may include a standardization or filtering aspect for standardizing the universe of materials. The standardization may be performed by the one or more filter engine(s) 20.

The general user from terminal 12c may activate the program for recommending the one or more materials either from terminal 12c or via the selection of an icon on the GUI display of 12c which generates a connection to web server 18 and activates the software program. Upon activation, the universe of materials may be received as data at web server 18 as illustrated in block 30. Data may also be received from the other databases, for example, the manufacturing data (block 32), the sourcing data (block 34), the design data (block 36), and the vehicle program data (block 38). One or more instructions originating from terminal 12c or web server 18 may be transmitted to the one or more filter engine(s) 20 to filter or standardize the data as illustrated in block 40.

The data received from the one or more databases 16 may be received by the one or more filtering engines 20 to generate the filtered data. The filtered data may then be generated as illustrated in block 42. Additionally, based on the filtered or standardized data, one or more materials for consideration in the recommendation process may be generated as illustrated in block 44. The materials for consideration may be transmitted to the determination engine 22 as illustrated in block 46.

Figure 3:
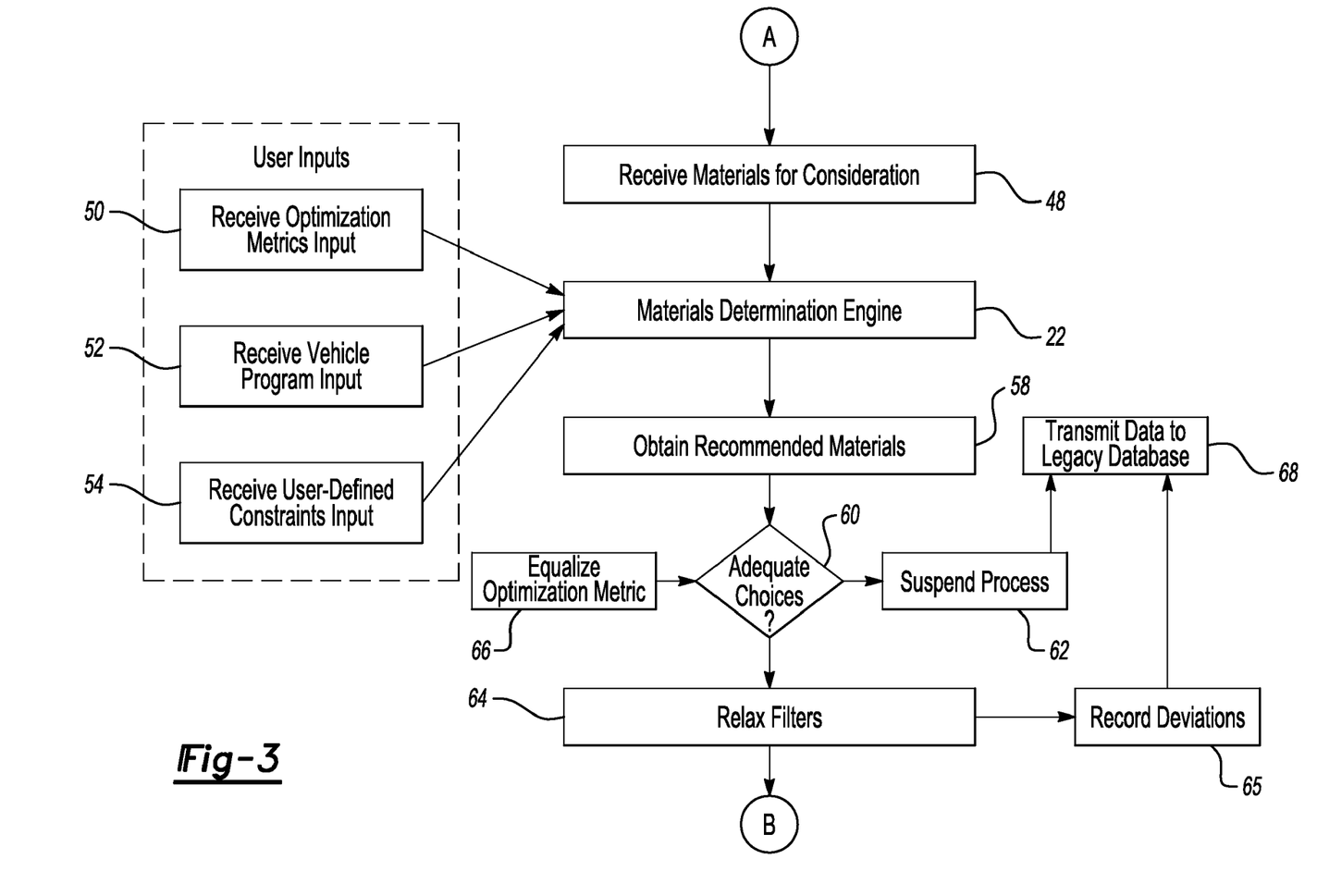
FIG. 3 shows a materials recommendation process for one or more parts according to another one of the various embodiments.

FIG. 3 illustrates another aspect of the process for recommending materials for one or more parts. The process may continue from circle block A. Additionally, or alternatively, the process may begin at circle block A. The additional aspect may include determining the materials to be used. The determination may include a recommendation of materials. In one embodiment, the recommendation may further include a rank of the materials according to, for example, one or more metrics inputted by the general user.

During the determination aspect, the general user, from terminal 12c, may interact with system 10. The user may receive on terminal 12c a GUI-based display having one or more fields or prompts to input one or more inputs. In one embodiment, the user may receive the display upon activating the software (e.g., prior to the standardization aspect).

The determination engine 22 may receive the materials for consideration as illustrated in block 48. As illustrated in block 50, the user may input one or more optimization metrics. The optimization metrics may include performance metrics for the materials of one or more parts. Additionally or alternatively, the optimization metrics may be for the one or more parts being manufactured. Non-limiting examples of performance metrics may include dent resistance, bending strength, torsion stiffness, bending stiffness, and tensile strength.

In one embodiment, the performance metric models of the optimization metric library database 14a may include the performance metrics as functions of one or more performance parameters described above. For example, one non-limiting performance metric may be torsion stiffness as a function of a particular modulus and thickness value. Another non-limiting performance metric may be bending strength as a function of yield strength and geometry. It should be understood that the performance metric can be a function of one or a plurality of performance parameters. These one or more performance metrics may be stored in the library of optimization metrics as models in database 14a for selection by a user from terminal 12c.

The user may also input information associated with one or more vehicle programs as illustrated in block 52. The vehicle program information may include, but is not limited to, the vehicle type (e.g., Ford F-150, Ford Focus, etc) and the model year of the vehicle.

The user may also input one or more constraints as illustrated in block 54. The one or more part constraints may be information pertaining to the part for which the one or more materials are being selected including, but not limited to, one or more part parameters. For example, the part information may include the part's size, weight, and dimensions.

In one embodiment, constraints may be defined or determined by the OEM. The costs of materials is a non-limiting example of an OEM-defined constraint.

With respect to costs of materials constraint, the optimization metric library of database 14a may also include cost metric models. The cost metric models may define how the cost value of one or more materials may be determined as part of recommending one or more materials for use in manufacturing one or more parts. In one embodiment, the cost metrics may be used if the user inputs cost as a parameter in determining the performance metric. In another embodiment, the determination engine 22 may use the one or more cost metrics each time a recommendation is made for materials. An exemplary, non-limiting cost model may be as follows:

total cost=materials cost+coating cost+shipping cost

In one embodiment, the one or more cost model parameters may include additional cost models. For instance, in the above example:
Cost Model 1 materials cost=amount of material×unit material cost

Cost Model 2 coating cost=amount of coating×unit coating cost

Cost Model 3 shipping cost=distance shipped×unit shipping cost

Additionally, database 14b may include one or more cost values for each cost parameter in the one or more cost metrics. Thus, in the example above, data in database 14b may include the values for the materials cost, the coating cost and the shipping cost. Additionally or alternatively, database 14b may include values for the material amount, the unit materials cost, the coating amount, the unit coating cost, shipping distances, and the unit shipping cost. Like the performance parameter value, the cost parameter values may be received by the determination engine 22 for recommending the one or more materials to be used in manufacturing one or more parts.

In one embodiment, the cost parameter values may be time-dependent such that the values may be different for different time periods. For example, the cost metric model may include a parameter to account for inflation such that each value in the cost model changes on a yearly basis. As another non-limiting example, the time-dependent values may be actual or estimated contract prices over some future years. Furthermore, the cost parameter values may be obtained in real time from an external source such as the London Metals Exchange.

Upon receiving the information from the one or more databases and the inputs from the user, the information may be synthesized or process to generate one or more materials for display to the user as illustrated in block 56. For example, processing may include, but is not limited to, calculating the cost for materials based on the cost parameter values in database 14b.

In one embodiment, the materials displayed to the user may be ranked according to the materials most accurately meeting the user's requirements. Accordingly, the determination engine 22 may include a ranking algorithm for ranking the materials.

The materials that may be recommended may be based on supplier-dependent data. For example, certain grades of materials may be specific to particular suppliers. Based on data in database 16, the determination engine 22 may, accordingly, retrieve materials associated with the specific suppliers. In some instances, however, the information for a particular supplier may be limited or missing (e.g., there may be no cost for the material provided by the specific supplier). In such instances, the determination engine 22 may retrieve generic information (e.g., cost information) for the material. The generic information may be provided by, for example, the OEM.

Upon displaying the recommended materials, a determination may be made whether the materials displayed were acceptable to the user as illustrated in decision block 60. If the one or more materials are acceptable, instructions may be received by the web server 18 to suspend any further action as illustrated in block 62.

If the one or more materials are not acceptable, instructions may be sent to filter engine 20 to relax one or more filter strategies or standardization criteria used in the previous iteration as illustrated in block 64. In this way, broader results may be received. Upon relaxing the filters, the process for recommending materials may recommence as represented by circle block B. In one embodiment, where the filters are relaxed, a log may be created by server 18 including one or more deviations from the one or more constraints defined by the OEM and/or the user as illustrated in block 65.

In one embodiment, one or more optimization metrics may be equalized in order to further analyze, for example, the adequacy of the recommended materials as illustrated in block 66. Non-limiting examples of metrics that may be equalized include weight and cost.

Figure 4A:
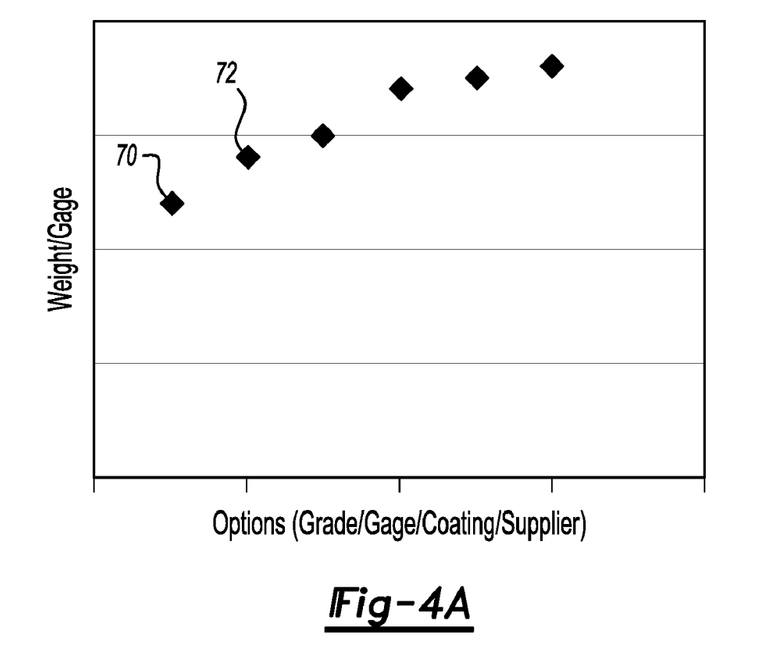
FIGS. 4A AND 4B show illustrative outputs of a materials recommendation process according to one or more embodiments.
Figure 4B:
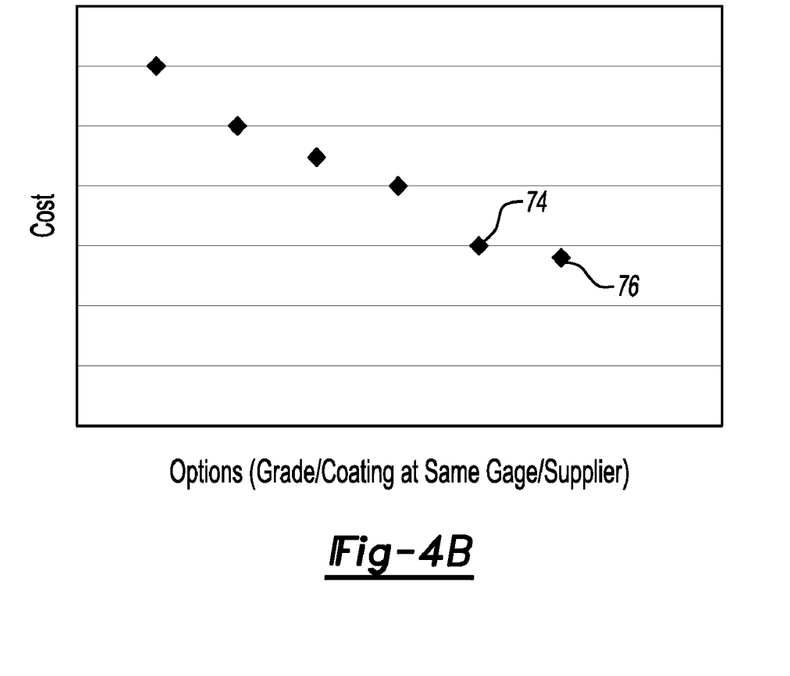

FIGS. 4A and 4B illustrate exemplary reports generated from the one or more equalization events. FIG. 4A shows a graph representing the weight of each recommended material when cost is equalized. The material options may be identified by grade, gage, coating, and the supplier providing the material. These identifiers are exemplary and other may be used as well. Thus, as illustrated in FIG. 4A, six materials may be recommended that have an equal cost. Each material may or may not have a different weight. In this example, the first material, DP 790 1.8 mm GI (Supplier A), represented by plot point 70 has a lower weight than the second material, DP 590 2 mm GI (Supplier B), represented by plot point 72. It should be understood that these examples are non-limiting.

FIG. 4B shows a similar report where weight is equalized and the material options are arranged according to cost. In this example, the materials may be identified by grade and a coating at the same gage (i.e., weight). Thus, as represented by plot point 74, DP 780 1.8 mm (Supplier A) is at a higher cost than DP 780 1.8 mm (Supplier B) as represented by plot point 76. Thus, this analysis indicates that with weight equalized, the material grade DP 780 is more expensive from Supplier A than from Supplier B. In one embodiment, the costs associated with each part may be hidden from a general user based on the access level assigned to the general user by the administrator. This may be to comply with, for example, confidentiality agreements with suppliers.

It should be understood that the graphs in FIGS. 4A and 4B are for illustration purposes and other ways of reporting the information can be used as is known in the art.

Referring back to FIG. 3, as illustrated in block 68, the results of the recommendation process as described above may be stored in a legacy materials selection database 24 (FIG. 1). The legacy material database 24 may be in communication with the web server 18. Data in database 24 may include, but is not limited to, the deviations log, rationales for a user selecting particular recommended materials, and historical rankings of materials. In one embodiment, the information in database 24 may assist an OEM in determining the adequacy of using historically selected materials with current vehicle programs and/or analyzing the ranking change of one or more materials over time.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A computer-implemented method for recommending one or more materials comprising:
　receiving data from at least three data sources including a sourcing data source, a manufacturing data source, and a design data source;
　filtering the data to obtain a filtered dataset of materials by performing the following applying steps:
　　applying at least one materials strategy filter to filter the data to sort out preferred materials and necessary materials;
　　applying at least one manufacturing strategy filter to filter the data to sort out materials that reduce plant complexity;
　　applying at least one purchasing strategy filter engine to filter the data to sort out materials meeting cost constraints;
　receiving input optimization metrics and one or more constraints for a filtered dataset of materials; and
　optimizing the filtered dataset of materials based at least on the one or more optimization values and the one or more constraints to obtain one or more recommended materials from the dataset of materials for use in a design of one or more parts.

2. The computer-implemented method of claim 1 wherein the one or more optimization metrics include one or more cost metrics and the one or more optimization values include one or more cost values.

3. The computer-implemented method of claim 1 wherein the one or more optimization metrics include one or more performance metrics and the one or more optimization values include one or more performance values.

4. The computer-implemented method of claim 1 further comprising receiving as user input the one or more optimization metrics selected by the user from one or more optimization metric data libraries.

5. The computer-implemented method of claim 4 wherein the one or more optimization metric data libraries includes at least one cost metric library and at least one performance metric library.

6. The computer-implemented method of claim 1 wherein the filtering to sort out materials that improve manufacturing process efficiency include filtering to sort out materials that are locally available.

7. The computer-implemented method of claim 1 wherein at least one of the one or more optimization values is a time-dependent value.

8. The computer-implemented method of claim 7 wherein the at least one time-dependent optimization value is a cost of materials.

9. The computer-implemented method of claim 1 wherein the one or more optimization metrics include a first optimization metric and a second optimization metric, the method further comprising:
　equalizing on the one or more computers the first optimization metric to a specific value; and
　ordering on the one or more computers the recommended materials according to the second optimization metric.

10. A computer-implemented system for recommending one or more materials used in designing and manufacturing one or more parts, the system comprising:
　at least one computer configured to:
　　receive data from at least three data sources including a sourcing data source, a manufacturing data source, and a design data source;
　　filter the data to obtain a filtered dataset of materials by performing the following applying steps:
　　　applying at least one materials strategy filter to filter the data to sort out preferred materials and necessary materials;
　　　applying at least one manufacturing strategy filter to filter the data to sort out materials that reduce plant complexity; and
　　　applying at least one purchasing strategy filter engine to filter the data to sort out materials meeting cost constraints;
　　receive one or more optimization metrics and one or more constraints for a filtered dataset of materials; and
　　optimize the filtered dataset of materials based on the one or more optimization values and the one or more constraints to obtain one or more recommended materials from the dataset of materials for use in a design of one or more parts.

11. The computer-implemented system of claim 10 further comprising an optimization metric parameter value database, wherein the at least one computer is further configured to determine the one or more optimization values by receiving the one or more optimization values from the optimization metric parameter value database.

12. The computer-implemented system of claim 11 wherein the at least one computer configured to optimize is further configured to perform a calculation based on the one or more optimization values received from the optimization metric parameter value database.

13. The computer-implemented system of claim 10 wherein the at least one computer is further configured to:
　generate one or more computer-aided design (CAD) models at least partially based on the one or more recommended materials; and
　display the one or more CAD models.

14. The computer-implemented system of claim 13 wherein the at least one computer is further configured to optimize with respect to the one or more CAD models.

15. The computer-implemented system of claim 13 wherein the one or more CAD models are one or more parametric finite element models.

16. The computer-implemented system of claim 10 wherein the filtering to sort out materials that improve manufacturing process efficiency include filtering to sort out materials that are locally available.

17. A computer-program product embodied in a computer readable medium for recommending one or more materials used in designing and manufacturing one or more parts, the computer-program product comprising instructions for:
　receiving data from at least three data sources including a sourcing data source, a manufacturing data source, and a design data source;
　filtering the data to obtain a filtered dataset of materials by applying at least one manufacturing strategy filter to filter the data to sort out materials that reduce plant complexity;
　receiving input optimization metrics and one or more constraints for a filtered dataset of materials; and
　optimizing the filtered dataset of materials based at least on the one or more optimization values and the one or more constraints to obtain one or more recommended materials from the dataset of materials for use in a design of one or more parts.

18. The computer-program product of claim 17 wherein the filtering further includes:

applying at least one materials strategy filter to filter the data to sort out preferred materials and necessary materials; or applying at least one purchasing strategy filter engine to filter the data to sort out materials meeting cost constraints.

* * * * *